(12) United States Patent
Murphy et al.

(10) Patent No.: US 8,509,226 B1
(45) Date of Patent: Aug. 13, 2013

(54) MULTI-TENANT SERVICE MANAGEMENT IN A VOIP NETWORK

(75) Inventors: Chris Murphy, Austin, TX (US); Eric Maginniss, Round Rock, TX (US); David Walsh, Austin, TX (US); Evin Hunt, Austin, TX (US)

(73) Assignee: Orisha Holdings, L.L.C., Austin, TX (US)

( * ) Notice: Subject to any disclaimer, the term of this patent is extended or adjusted under 35 U.S.C. 154(b) by 0 days.

(21) Appl. No.: 13/600,844

(22) Filed: Aug. 31, 2012

(51) Int. Cl.
*H04L 12/66* (2006.01)

(52) U.S. Cl.
USPC ....... 370/352; 705/26.1; 705/26.2; 705/26.35

(58) Field of Classification Search
USPC .................. 370/352; 705/26.1–26.9, 27–1, 705/27.2
See application file for complete search history.

(56) References Cited

U.S. PATENT DOCUMENTS

| | | | | |
|---|---|---|---|---|
| 2002/0101858 A1* | 8/2002 | Stuart et al. | ................... | 370/352 |
| 2002/0141420 A1* | 10/2002 | Sugiarto | ...................... | 370/401 |
| 2005/0135576 A1* | 6/2005 | Gilles et al. | ............... | 379/88.18 |
| 2005/0213567 A1* | 9/2005 | Mullins et al. | ................. | 370/352 |
| 2006/0015467 A1* | 1/2006 | Morken et al. | ................ | 705/400 |
| 2008/0004972 A1* | 1/2008 | Ghanma | .......................... | 705/26 |
| 2009/0125409 A1* | 5/2009 | Barton | ............................ | 705/26 |
| 2011/0179176 A1* | 7/2011 | Ravichandran et al. | ...... | 709/226 |

* cited by examiner

*Primary Examiner* — Joseph J Nguyen
(74) *Attorney, Agent, or Firm* — Rory D. Rankin; Meyertons, Hood, Kivlin, Kowert & Goetzel, P.C.

(57) ABSTRACT

A system and method for aggregating services within a VoIP network. The VoIP network comprises a plurality of vendors, resellers, and users, and each reseller aggregates a plurality of services from the vendors and other resellers. Each type of service may be organized into two or more tiers, with each tier including one or more services. Each tier is presented to downstream users as a single price and is re-branded with the reseller's branding elements. Downstream users can select a desired service from a given tier, and the tier may automatically select a service that maximizes the profit for the reseller.

17 Claims, 11 Drawing Sheets

*Tier 326*

| Pricing Group A | |
|---|---|
| *Telephone Number 605* | *$* |
| *Telephone Number 606* | *$* |
| *Telephone Number 607* | *$* |
| ⋮ | |
| Pricing Group B | |
| *Telephone Number 615* | *$$* |
| *Telephone Number 616* | *$$* |
| *Telephone Number 617* | *$$* |
| ⋮ | |
| Pricing Group C | |
| *Telephone Number 625* | *$$$* |
| *Telephone Number 626* | *$$$* |
| *Telephone Number 627* | *$$$* |
| ⋮ | |
| ⋮ | |

*FIG. 6*

Versioning Database 800

| Telephone Number | Date | E911 | Reseller | Voice Mail | SIP Trunk | Price | Other |
|---|---|---|---|---|---|---|---|
| 555-0000 | 03-04-2005 | Vendor 805 | | | | | |
| | 08-11-2007 | | Reseller 815 | | Vendor 810 | $1.00 | |
| | 04-20-2008 | Vendor 820 | | | | | |
| | 01-06-2009 | | | | | | |
| 555-0001 | 09-26-2008 | | | Vendor 825 | | | |
| | 11-14-2008 | Vendor 830 | | | | | |
| 555-0002 | 04-18-2002 | | Reseller 835 | | | | |
| | 06-28-2006 | | Reseller 840 | | | $.90 | |
| | 12-18-2008 | | | Vendor 845 | | $.80 | |
| | 01-09-2009 | | | | Vendor 850 | | |
| | 08-30-2009 | Vendor 855 | | | | | |
| ... | | | | | | | |

*FIG. 8*

MULTI-TENANT SERVICE MANAGEMENT IN A VOIP NETWORK

BACKGROUND

1. Field of the Invention

The present invention relates generally to Voice over Internet Protocol (VoIP) communications, and in particular to managing telephone numbers and other services in a VoIP network platform.

2. Description of the Related Art

Many enterprises and consumers are replacing their traditional analog telephone service with VoIP service. VoIP offers many advantages over traditional analog telephone service, including cost savings, flexibility, advanced features, and integration with database and customer relationship management (CRM) software. A multitude of VoIP vendors have emerged to supply customers with the software and hardware components necessary to provide VoIP service. As a result, end-users have a wide variety of VoIP suppliers to choose from when purchasing software and hardware equipment. Also, VoIP communication solution providers have a wide variety of VoIP suppliers to choose from when provisioning hardware and software equipment to their end users.

As is often the case in heterogeneous VoIP networks, various resellers often have a variety of different relationships and interfaces to manage, and these interfaces may resemble a swivel-chair approach in which each interface is unique and handled separately. To manage each relationship or service within a specific platform, a reseller may have to switch between different software interfaces and/or applications for each separate service provided within the VoIP network platform. As used herein, a VoIP network platform may be broadly defined as a network infrastructure and user equipment capable of carrying voice signals as packetized data over an Internet Protocol (IP) network. A VoIP network platform may comprise at least the following hardware and software components and features: feature servers, softswitches, session initiation protocol (SIP) trunks, enhanced 911 (E911), direct inward dialing (DID), billing services, least cost routing, PBX equipment, and user devices. For each of these components, a VoIP provider may have many different suppliers to choose from when building its VoIP communication platform.

For example, a reseller may be tasked with selecting and activating a telephone number from one of many different telephone number providers. Providing interfaces to each of the different telephone number suppliers and managing the total inventory of telephone numbers may be a challenge for VoIP resellers. Therefore, there exists a need in the art for methods and mechanisms to aggregate and resell VoIP services in a VoIP network platform.

SUMMARY

Various embodiments of systems and methods for managing VoIP services contemplated.

In various embodiments, a first reseller may be connected to multiple telephone number vendors and/or resellers, and the first reseller may execute a multi-tenant system management software application configured to aggregate a plurality of telephone numbers from these suppliers. The software application may be configured to allow the first reseller to group the available telephone numbers into separate pricing tiers. Then, the first reseller may present these separate tiers to their customers and downstream resellers. The telephone numbers provided for sale by the first reseller may be re-branded with the first reseller's branding elements.

Each tier group may have a single price that applies to all of the telephone numbers being resold in the tier group. A lower level reseller or end-user coupled to the first reseller may select from the first reseller's tier groups. The software application may be configured to select from within the tier group in order to maximize the profit generated for the first reseller. For example, while each of the telephone numbers in a given tier group may be sold at a first price, the cost of telephone numbers to the first reseller (from a variety of sources) may vary over a wide range. The software application may be configured to automatically select from the cheapest telephone numbers first so as to maximize the profit margin for the first reseller.

In one embodiment, a second reseller may be connected downstream from the first reseller in the VoIP network platform. The second reseller may create their own tiers of phone numbers to sell to their own end-users and downstream resellers. These sets of tiers may be different from the tiers of phone numbers created by the first reseller. Also, the tiers may be set up so that if a downstream user or reseller of the second reseller selects a telephone number from a given tier, then the tier may be set up by default to select from the available phone numbers in a way that maximizes the margin for the second reseller. Furthermore, more resellers may be positioned below the second reseller, and each reseller may aggregate telephone numbers into separate tiers that are unique to each specific reseller.

In one embodiment, historical data may be generated and tracked for a plurality of telephone numbers that are utilized in the VoIP network platform. Each telephone number may a variety of attributes associated with the telephone number, and the VoIP service provided to the specific telephone number may be based on multiple relationships with other service providers. For example, a given telephone number may have a price, an E911 association, reseller association, SIP trunk vendor, as well as other relationships and attributes. Each of these relationships and attributes may be tracked for each telephone number in the VoIP system, and any time a change is detected, then a status of the telephone number may be stored in a versioning database.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6 illustrates one embodiment of the various pricing groups within a tier.

FIG. 8 illustrates one embodiment of a versioning database.

DETAILED DESCRIPTION OF EMBODIMENTS

Figure 1:
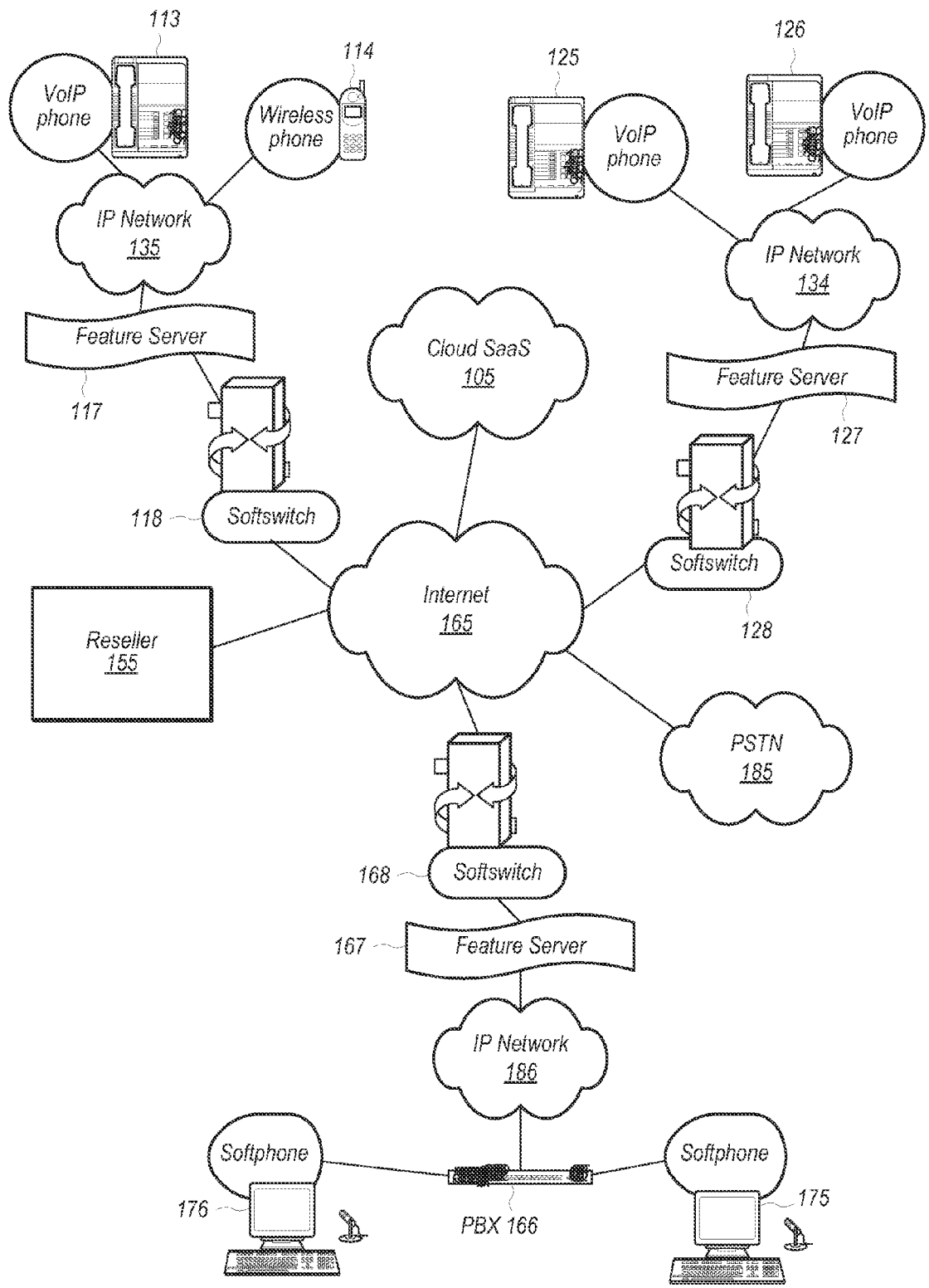
FIG. 1 illustrates one embodiment of a portion of a VoIP network platform.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a server . . . " Such a claim does not foreclose the system from including additional components (e.g., a network, a reseller, a vendor).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, for a VoIP network having five resellers, the terms "first" and "second" resellers can be used to refer to any two of the five resellers.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, one embodiment of a portion of a VoIP network platform is shown. VoIP phone 113 and wireless phone 114 may be configured to originate VoIP calls. VoIP phone 113 and wireless phone 114 are representative of any number of VoIP phones and wireless phones, respectively, which may be part of a VoIP network platform. VoIP phone 113 and wireless phone 114 are connected to internet protocol (IP) network 135, through which they are connected to feature server 117. IP network 135 may be a session initiation protocol (SIP) trunk or any other type of IP connection, link, or network.

Feature server 117 may provide a plurality of features for calls routed to and from VoIP phone 113 and wireless phone 114. The plurality of features may comprise auto attendant, voicemail, call forwarding, click to call, find me follow me, caller ID, speech recognition, integrated voice response, text messaging, short-message service (SMS), do not disturb, shared call appearance, shared line appearance, simultaneous ring, busy lamp field, line state monitoring, and others. The term "call" may refer to a voice call or to a multimedia call containing video, audio, text, and/or other data. Also, "call" may refer to a connection between two users or to a connection between a plurality of users, like in a multi-party conference call.

Feature server 117 is also connected to softswitch 118 through which calls may be terminated and routed through the internet 165. In one embodiment, feature server 117 and softswitch 118 may be combined into one unit. In another embodiment, feature server 117 may incorporate all of the functionality of softswitch 118. In a further embodiment, softswitch 118 may incorporate all of the functionality of feature server 117. Once calls are routed to the internet 165, the calls may be routed to the public switched telephone network (PSTN) 185, to other softswitches, or to other networks or routers not shown in FIG. 1.

VoIP phones 125 and 126 are connected to IP network 134, through which they are connected to feature server 127. Feature server 127 is also connected to softswitch 128 through which calls may be terminated and routed to the internet 165. Softphones 175 and 176 are connected to Private Branch Exchange (PBX) 166 through which they are connected to IP network 186. Softphones 175 and 176 may be software applications installed on networked computers that are equipped with microphones and speakers. PBX 166 may be representative of any number of PBX's which may be connected to any number of IP networks within the VoIP network platform. Calls originating from softphones 175 and 176 may be routed from IP network 186 to feature server 167. Feature server 167 may provide a plurality of features for calls routed to and from softphones 175 and 176. Feature server 167 is also connected to softswitch 168 through which calls may be terminated and routed to the internet 165.

Reseller 155 is also connected to the internet 165, and reseller 155 is representative of any number of resellers or VoIP providers that may sell or provide various VoIP services within the VoIP network. Reseller 155 may connect to cloud software as a service (SaaS) 105 via internet 165, and reseller 155 may access a VoIP system management software application (not shown) in cloud SaaS 105. The VoIP system management software application may allow reseller 155 to configure the components of the VoIP network platform to route and treat calls for the users. The VoIP system management software application may also allow reseller 155 to interface to various vendors, suppliers, and other resellers via built-in application programming interfaces (APIs) of the application. FIG. 1 illustrates one embodiment of a VoIP network platform. Other configurations of VoIP network platforms consisting of other types of components and devices are possible and are contemplated.

Figure 2:
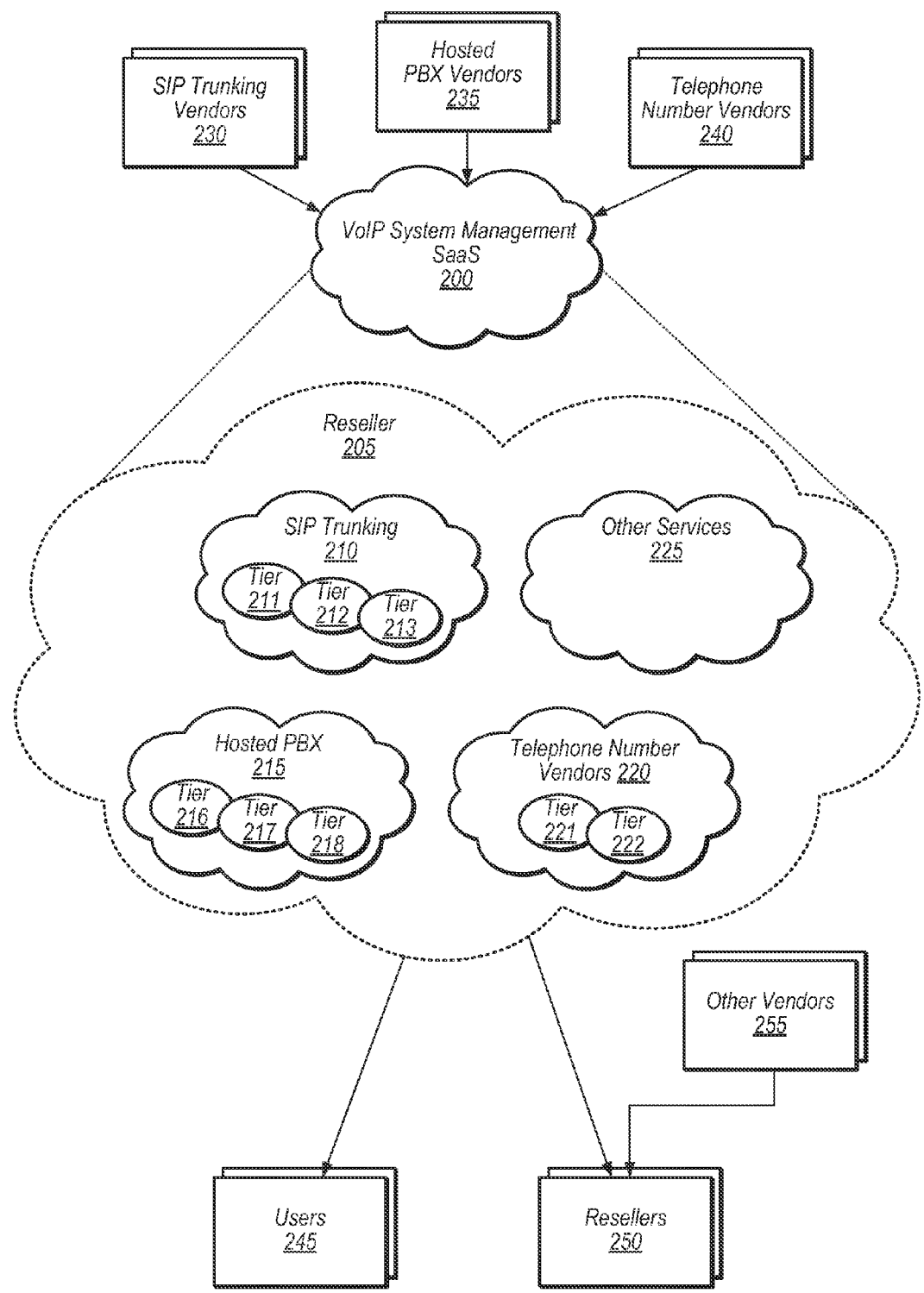
FIG. 2 illustrates one embodiment of a reseller and the reseller's connections to vendors, users, and other resellers.

Turning now to FIG. 2, a block diagram of one embodiment of a reseller running a SaaS application is shown. Reseller 205 may connect to VoIP system management SaaS 200 via the internet (not shown), and reseller 205 may run a virtual instance of SaaS 200. Reseller 205 may manage the virtual project partitioned from the multi-tenant VoIP system management software application executing in the cloud. Other resellers may also access VoIP system management SaaS 200 and manage their own individual virtual projects.

The virtual instance of the software application may allow reseller 205 to aggregate services from a wide variety of providers of different VoIP services. As shown in FIG. 2, these aggregated services include SIP trunking 210, hosted PBX 215, telephone numbers 220, and other services 225. These services are shown within the virtual project bubble of reseller 205 to indicate that these services are integrated into the virtual project of reseller 205. Other services 225 are representative of any number of other services (e.g., voicemail, video conferencing, storage, E911). Reseller 205 may also have a plurality of local, proprietary interfaces to its own VoIP services that may be aggregated with the other VoIP services accessed through SaaS 200.

Each service may be grouped into one or more tiers, and each of the services of a single tier may be priced at the same level. These tiers may be presented to users and resellers who are downstream purchasers of VoIP services from reseller 205. The tiers that are shown are representative of any number of tiers that may be utilized for each service. For example, SIP trunking services 210 may be split up into three tiers 211-213, hosted PBX services 215 may be split up into three tiers 216-218, and telephone numbers 220 may be split up into two tiers 221 and 222. Each service of other services 225 may also be organized into two or more tiers.

In one embodiment, reseller 205 may also utilize the multi-tenant SaaS 200 residing in the cloud to add third-party services to its various service offerings and white-brand and sell those third-party services as if they were their own. In one embodiment, reseller 205 may connect to the multi-tenant SaaS 200 via a portal application. The third-party services may be added to the various tiers in any suitable fashion determined by reseller 205. All of the services, including the local and the third-party services, may be aggregated using the SaaS 200 and provided to users 245 and resellers 250. Preexisting workflows and/or newly generated workflows for a variety of tasks and functions may also be aggregated within the VoIP network using the SaaS 200. Resellers 250 are representative of any number of resellers connected downstream from reseller 205 that utilize various VoIP services from reseller 205. It is noted that resellers 250 may also be coupled to other vendors 255, using the same multi-tenant SaaS 200 utilized by reseller 205.

In the embodiment shown in FIG. 2, reseller 205 may utilize the multi-tenant SaaS 200 to interface to external vendors, such as SIP trunking vendors 230, hosted PBX vendors 235, and telephone number vendors 240. The multi-tenant SaaS 200 may include an application programming interface (API) to each of the vendors. The API's may be built-in to the SaaS 200, and reseller 205 may be able to utilize these APIs for interfacing to these various external vendors of VoIP services in a unified software environment. In various embodiments, SaaS 200 provides a common interface for accessing and utilizing the various distinct APIs that may be needed for each of vendors 230, 235, and 240. For example SaaS 200 may include translation mechanisms (software and/or hardware) to translate the various APIs to a common API. In this manner, reseller 205 has a single common interface which provides simplified management of the various services provided by the vendors.

The underlying SaaS 200 and database may utilize a multi-tenant architecture for multiple resellers, vendors, and users. The interface to the SaaS 200 and database allows for ease of aggregation of the various VoIP services that are being provided in the VoIP network. For example, the SaaS 200 may be configured to allow telephone number origination services to be aggregated. Through the use of an interface to the SaaS 200, resellers may be able to manage telephone number activation for their downstream customers for any telephone number sourced from any of their upstream vendors or resellers.

Figure 3:
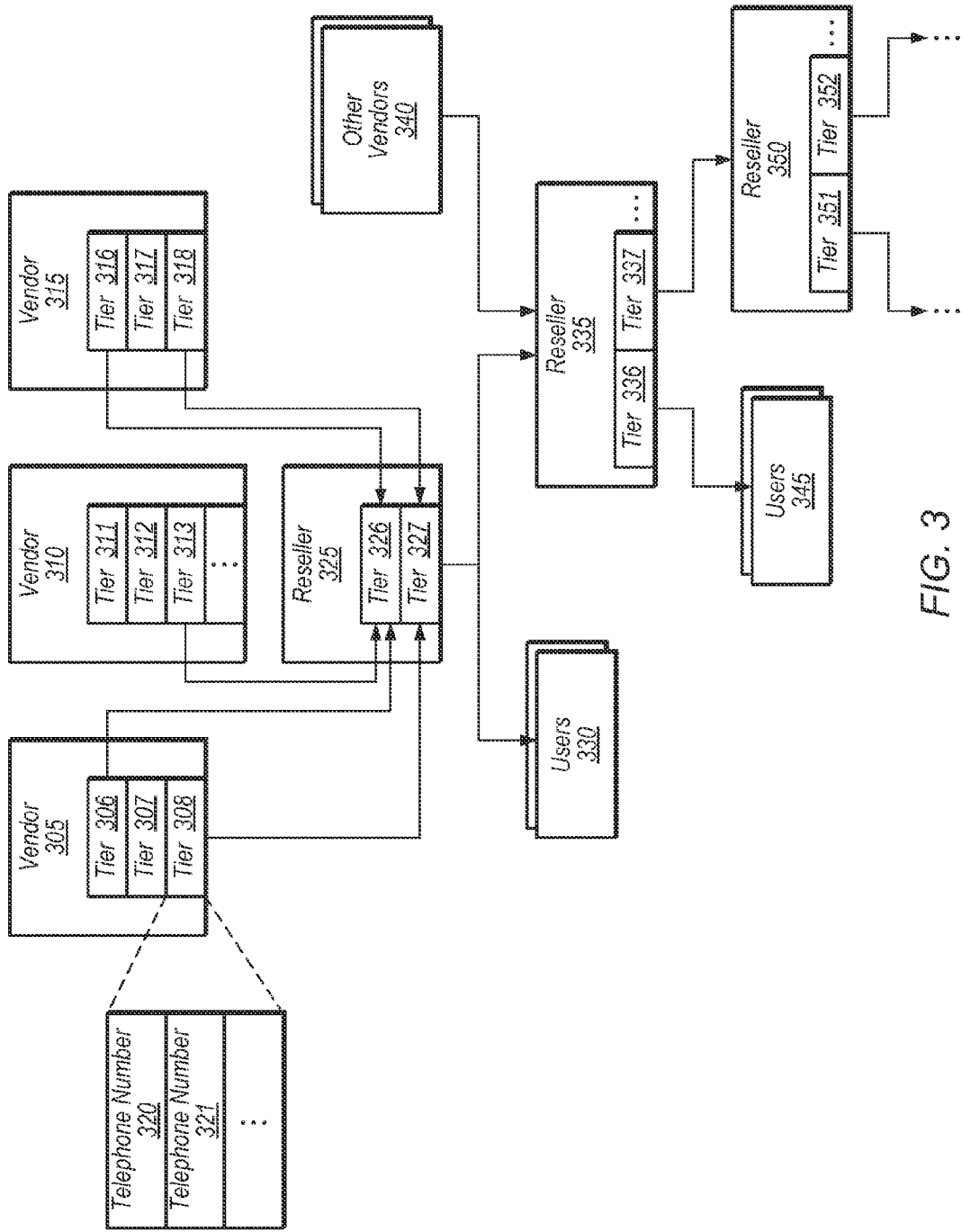
FIG. 3 illustrates one embodiment of the aggregation of telephone numbers provided by a variety of vendors and resellers.

Referring now to FIG. 3, one embodiment of the aggregation of telephone numbers provided by a variety of vendors and resellers is shown. Reseller 325 may combine telephone numbers from upstream providers' tiers into a common tier within its platform, and reseller 325 may resell the common tier as a single-priced tier to its customers and to downstream resellers. Also, reseller 325 may prioritize the order in which telephone numbers are selected from a given tier to maximize margin. Each reseller shown in FIG. 3 may be configured to execute, or otherwise access, a unified software application for aggregating telephone numbers from a variety of vendors and resellers. In one embodiment, the unified software application may be a multi-tenant SaaS that is accessed through a web portal.

Downstream resellers may also be coupled to reseller 325 for obtaining telephone numbers. For example, reseller 335 may combine telephone numbers obtained from tiers 326 and/or tier 327 of reseller 325 with other telephone numbers obtained from other vendors 340 into a single tier 336. Tier 337 may also be created in a similar fashion by combining various telephone numbers from the tiers of upstream resellers and vendors.

Vendor 305 may group telephone numbers into three separate tiers 306, 307, and 308. Tiers 306-308 are representative of any number of tiers which may be utilized by vendor 305. As shown, tier 308 may include telephone numbers 320 and 321 and any number of other telephone numbers. Similarly, tiers 306 and 307 may include any number of telephone numbers. The reasons for grouping together telephone numbers into tiers may be based on any of various types of criteria (e.g., pricing, geographical location, toll-free numbers).

Similarly, vendor 310 may group its supply of telephone numbers into at least three separate tiers 311, 312, and 313. Also, vendor 315 may group its inventory of telephone numbers into three separate tiers 316, 317, and 318. Reseller 325 may also be coupled to any number of other vendors not shown in FIG. 3. Also, one or more of vendors 305, 310, and 315 may also be resellers of telephone numbers and/or other VoIP services.

As shown in FIG. 3, reseller 325 may aggregate telephone numbers from tiers 306, 313, and 318 into tier 326. Also, reseller 325 may aggregate telephone numbers from tiers 308 and 318 into tier 327. Reseller 325 may make tiers 326 and 327 available to downstream users and resellers. Tiers 326 and 327 may be white-branded such that the telephone numbers in tiers 326 and 327 may be rebranded by reseller 325 and appear as though they are sourced directly from reseller 325.

This pattern may continue on down through the lower levels of the VoIP network platform. Reseller 335 may be coupled to reseller 325 and other vendors 340. Other vendors 340 are representative of any number of vendors which may supply telephone numbers to reseller 335. Tiers 336 and 337 may be created by grouping together telephone numbers from any number of vendors and resellers. Reseller 335 may aggregate a plurality of telephone numbers from a plurality of resellers and vendors and then resell these telephone numbers in a white-label fashion through a single interface. Downstream resellers (e.g., reseller 350) that are coupled to reseller 335 may also aggregate and resell telephone numbers in a single interface.

Although not shown in FIG. 3, reseller 335 may be coupled to vendors 305, 310, and 315, and tiers 336 and 337 may include various telephone numbers from vendors 305, 310, and 315. For example, reseller 335 may have an alternate connection (either direct or indirect, shown as a dashed line) to vendor 305, and telephone number 320 of tier 308 may be available through this connection. Also, reseller 335 is coupled to tier 327 of reseller 325, which also includes telephone number 320. In this case, there are two paths through which telephone number 320 may be made available to reseller 335. In various embodiments, these two paths (either logical and/or physical) may correspond to different price points, and the software application may be configured to automatically select the path for telephone number 320 that gives the lowest price to reseller 335 or otherwise chooses the path which maximizes some benefit to the reseller 335 (whether cost or otherwise). This concept may be applied for other resellers as well, and with many interconnections between resellers and vendors, many telephone numbers may be obtained by a particular reseller through two or more paths. The software application may be configured to select the cheapest available path from the multiple paths that are possible for a specific telephone number.

In some embodiments, the myriad interconnections between resellers and vendors may make it possible for a telephone numbers to return back to the reseller that originally sold the telephone number into the VoIP network. In these cases, the software application may be configured to prevent loop-back, such that a given telephone number may be prevented from being sold back to a reseller or vendor that previously sold the given telephone number.

Any reseller may utilize the unified software application with pre-integrated APIs to a variety of vendors and resellers, and this software application may also allow a reseller to manually load an inventory of telephone numbers and pricing information into the software application. The reseller may then aggregate the telephone numbers from a variety of sources and then organize these telephone numbers into pricing groups, and the pricing groups may be sold to downstream customers as the reseller's own telephone numbers.

The connections shown in FIG. 3 are not the only connections that may be made between the various entities. For example, although not shown in FIG. 3, vendors 305, 310, and 315 may be coupled to additional resellers and users besides just reseller 325. Also, each reseller shown in FIG. 3 may be connected to any number of vendors and other resellers. Also, each reseller shown in FIG. 3 may be connected to any number of other vendors (e.g., E911, SIP trunking, least cost routing, billing services) providing other services besides just telephone numbers. In some embodiments, vendors 305, 310, and 315 may also supply additional VoIP services in addition to telephone numbers.

Figure 4:
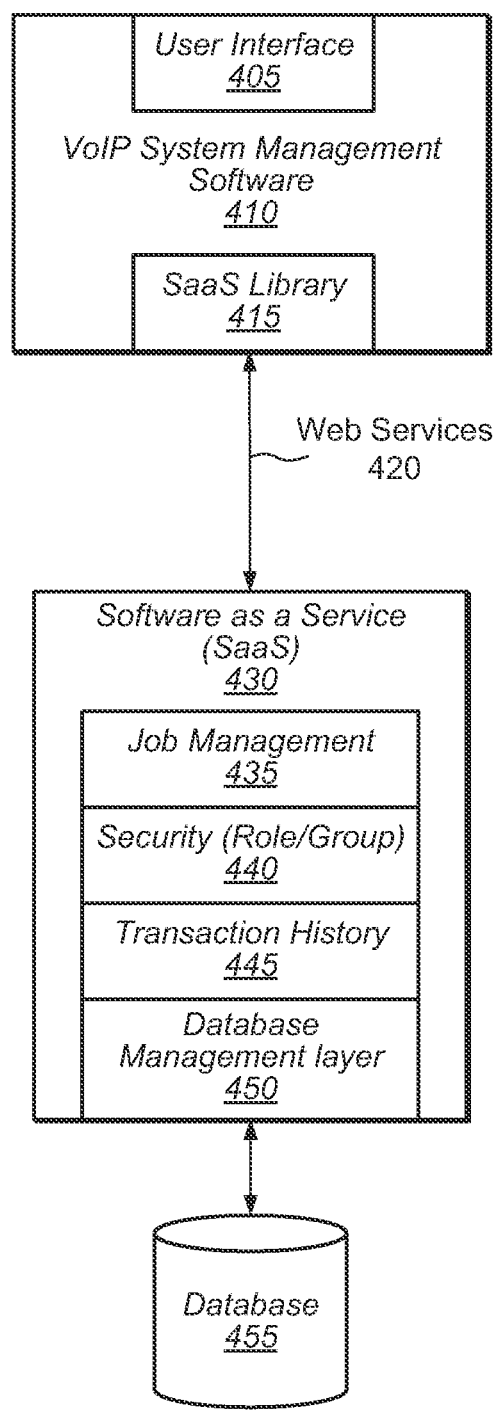
FIG. 4 illustrates one embodiment of VoIP system management software application.

Turning now to FIG. 4, a block diagram of one embodiment of a VoIP system management software application is shown. VoIP system management software application 410 is coupled to a database 455 through a Software as a Service (SaaS) database manager 430. The VoIP system management software application 410 is representative of any number of system management software applications that may be coupled to a single database 455, multiple databases, or an instance of the database 455. The VoIP system management software application 410 may be configured to run on a Microsoft Windows®, Linux®, Unix®, Solaris®, or other operating system hosted by a server or other computing device. In one embodiment, each reseller in a VoIP network may utilize an instance of software application 410 to manage relationships and interfaces between vendors, other resellers, and clients. In another embodiment, each reseller may share software application 410 in a multitenancy environment. In this embodiment, software application 410 may be virtually partitioned for each unique reseller.

The VoIP system management software application 410 may be comprised of at least a user interface 405 and a SaaS library 415. The user interface 405 may allow an administrator, technician, salesperson, or other person to configure or manage VoIP features, services, components, and user accounts. The SaaS library 415 may allow for bi-directional communications between the VoIP system management software application 410 and the SaaS 430. The SaaS library 415 may be configured to communicate in accordance with the SaaS API.

In one embodiment, web services 420 may manage the API calls between the VoIP system management software application 410 and SaaS 430 over a network. The network may be any of a variety of networks, such as a LAN, such as an Ethernet network, Fiber Distributed Data Interface (FDDI) network, token ring network, and wireless local area network (WLAN) based on the Institute of Electrical and Electronics Engineers (IEEE) 802.11 standards (Wi-Fi), and/or a WAN, such as the Internet, cellular data network, or other data communication network. In another embodiment, the VoIP system management software application 410 and SaaS 430 may reside on the same server or computing device.

In one embodiment, the VoIP system management software application 410 may access database 455 through SaaS 430. In another embodiment, the VoIP system management software application 410 may use a different application to access and manage the database 455. For example, the application to access and manage the database 455 may be another SaaS application, a platform as a service (PaaS) application, or other software application.

In one embodiment, SaaS 430 comprises a database management layer 450, a transaction history layer 445, a security layer 440, and a job management layer 435. The database management layer 450 may constitute the interface to the database 455. The database management layer 450 may communicate with the database 455 by complying with the database 455 API. The transaction history layer 445 may keep a log of recent transactions that have modified the database.

The log may be comprised of a catalog of the database objects that have been added or deleted, times when the changes were made, users who made the changes, and other information. The transaction history layer 445 may allow for transactions to be rolled back.

The security layer 440 may control access to portions of the database based on the role or group making the request. Several different VoIP system management software applications 410 may access a single database 455, and each VoIP system management software application 410 may be allowed to access only data or objects in the database 455 relevant to their specific VoIP network platform. In one embodiment, the security layer 440 may prevent unauthorized access of credit card numbers stored in database 455 for users not associated with the requesting VoIP system management software application 410. In another embodiment, the security layer 440 may secure other private information in the database and prevent unauthorized users or systems from acquiring this private information.

The job management layer 435 may provide batching of tasks for actions frequently performed. The tasks may be any of a variety of tasks associated with accessing the database, including: storing new objects in the database, deleting objects already in the database, adding attributes to an object in the database, modifying schema, and many others. The job management layer 435 may also provide a user interface, giving a user access to the selection and batching of tasks. Additional layers not pictured may be added to the SaaS 430, offering other services to the VoIP system management software application 410 when accessing the database 455. In another embodiment, the layers 435, 440, 445, and 450 may be arranged in a different order than the order shown in FIG. 4. In a further embodiment, some layers may be omitted and other layers not shown may be added.

The database 455 may store information associated with a VoIP network. The data may be stored in database 455 and accessed by one or more VoIP system management software applications 410. The database 455 may be an actual physical database, or it may be an instance of a physical database. The database 455 may any of a variety of types of databases, including PostgreSQL®, Microsoft® SQL, Oracle®, Sybase®, Informix® MySQL, Intervase®, or other types.

Figure 5:
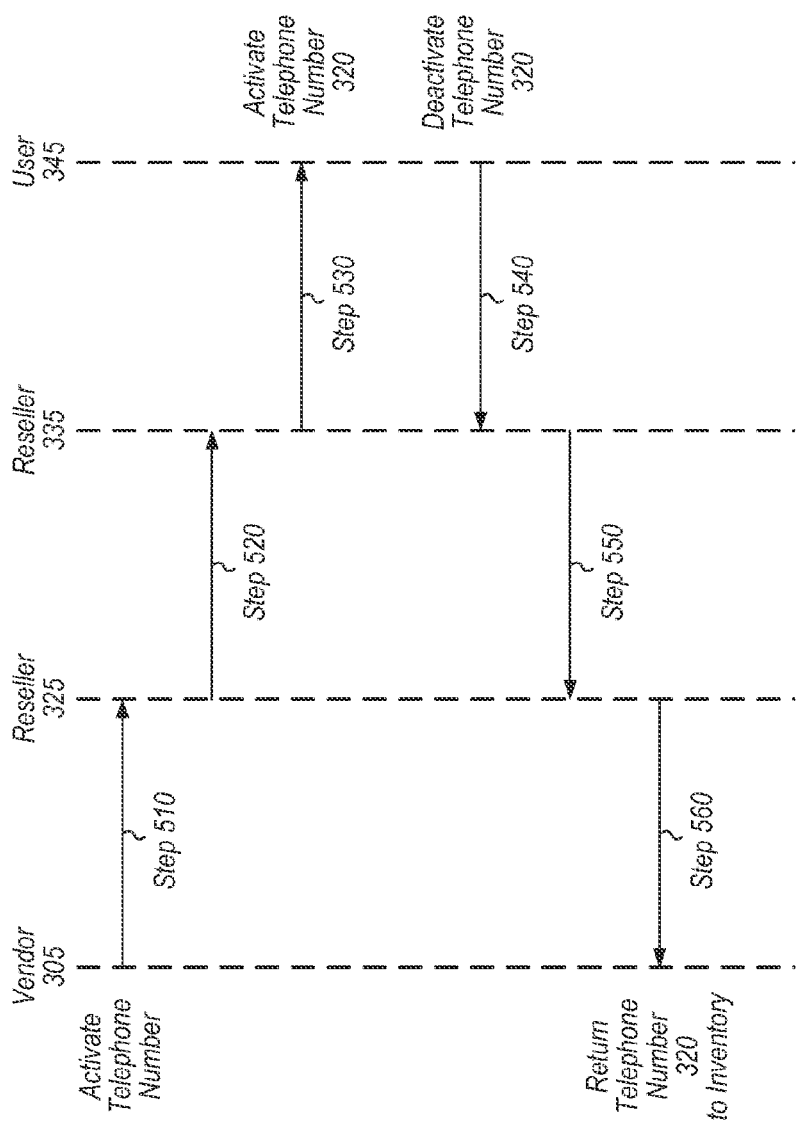
FIG. 5 illustrates one embodiment of an activation path and deactivation path of a telephone number.

Referring now to FIG. 5, one embodiment of an activation path and deactivation path of a telephone number is shown. The example shown in FIG. 5 is based on the configuration illustrated in FIG. 3 between vendors, resellers, and users. In the example shown in FIG. 5, user 345 is activating telephone number 320, which originates from vendor 305. Telephone number 320 may be processed by resellers 325 and 335 in order to become available to and activated by user 345. In other embodiments, the chain of resellers and vendors may be longer or shorter than that shown in FIG. 5 for the activation of a telephone number by an end-user.

Step 510 may be the activation path that telephone number 320 takes from vendor 305 to reseller 325. Step 510 may constitute a transaction between vendor 305 and reseller 325. Telephone number 320 may be pointed to an IP address associated with reseller 325 and routed to reseller 325 in step 510. Step 520 may be the activation path for telephone number 320 from reseller 325 to reseller 335. Finally, step 530 may be the final path of telephone number 320 as it is provided to user 345 and activated for use. User 345 may utilize telephone number 320 for VoIP service for any length of time. Then, at some future point, user 345 may change or cancel VoIP service for telephone number 320, resulting in telephone number 320 being deactivated.

When telephone number 320 is deactivated, then a reverse process may take place to return telephone number 320 to the inventory of vendor 305. Telephone number 320 may be returned to reseller 335 in step 540, and then telephone number 320 may traverse the path from reseller 335 to reseller 325 in step 550. Then, in step 560, telephone number 320 may traverse the path from reseller 325 to vendor 305 to return to the inventory of available telephone numbers offered by vendor 305.

Turning now to FIG. 6, one embodiment of the various pricing groups within a tier is shown. The telephone numbers shown in tier 326 may have been aggregated from a plurality of vendors and resellers. The example shown in FIG. 6 is only one example of the pricing groups that may exist within a single tier. Tier 326 shown in FIG. 6 corresponds to tier 326 shown in FIG. 3, and tier 326 may be presented to downstream users and resellers by reseller 325.

The prices of the different pricing groups represent the cost of acquiring these telephone numbers from upstream vendors and resellers by reseller 325. Pricing group A includes the cheapest telephone numbers in tier 326, indicated with a single '$', and these telephone numbers include numbers 605, 606, and 607, which are representative of any number of telephone numbers in pricing group A. Pricing group B includes the next cheapest telephone numbers in tier 326 (after pricing group A), indicated with a double '$$', and these telephone numbers include numbers 615, 616, and 617, which are representative of any number of telephone numbers in pricing group B. Pricing group C includes the most expensive telephone numbers in tier 326, represented by a triple '$$$', and these telephone numbers include numbers 625, 626, and 627, which are representative of any number of telephone numbers in pricing group C. In other embodiments, tier 326 may have other numbers of pricing groups greater than or less than three.

A downstream user or reseller may wish to acquire a telephone number from tier 326, and the telephone number may be automatically selected from the cheapest pricing group (Group A) so as to maximize the profit for reseller 325. If none of the telephone numbers from pricing group A fit the criteria determined by the user, then a telephone number from pricing group B may be selected. Likewise, if none of the telephone numbers from pricing group B fit the criteria indicated by the user, then a telephone number from pricing group C may be selected.

A user may utilize a user portal to connect to reseller 325 for purchasing and activating telephone numbers. Tier 326 may be displayed to the user via a user interface that is branded in accordance with reseller's 325 branding elements. In one embodiment, the user may specify one or more criteria that should be used for selecting a telephone number. For example, the user may specify a certain zip code, area code, or geographical area with which to associate the telephone number. Alternatively, the user may wish to select a vanity phone number that spells a specific word on the telephone keypad. After the user sets their preferred criteria, the user interface may display a list of telephone numbers that meet the criteria. In one embodiment, the list presented to the user may include the cheapest telephone numbers at the top of the list. Alternatively, only the cheapest telephone numbers (such as from pricing group A) may be shown in a first list to the user. If the user wishes for more choices, then telephone numbers from the other pricing groups (B and C) may be displayed to the user. Similarly, in one scenario, the user may wish for a toll-free telephone number, and pricing groups may be created within a tier with only toll-free telephone numbers.

Figure 7:
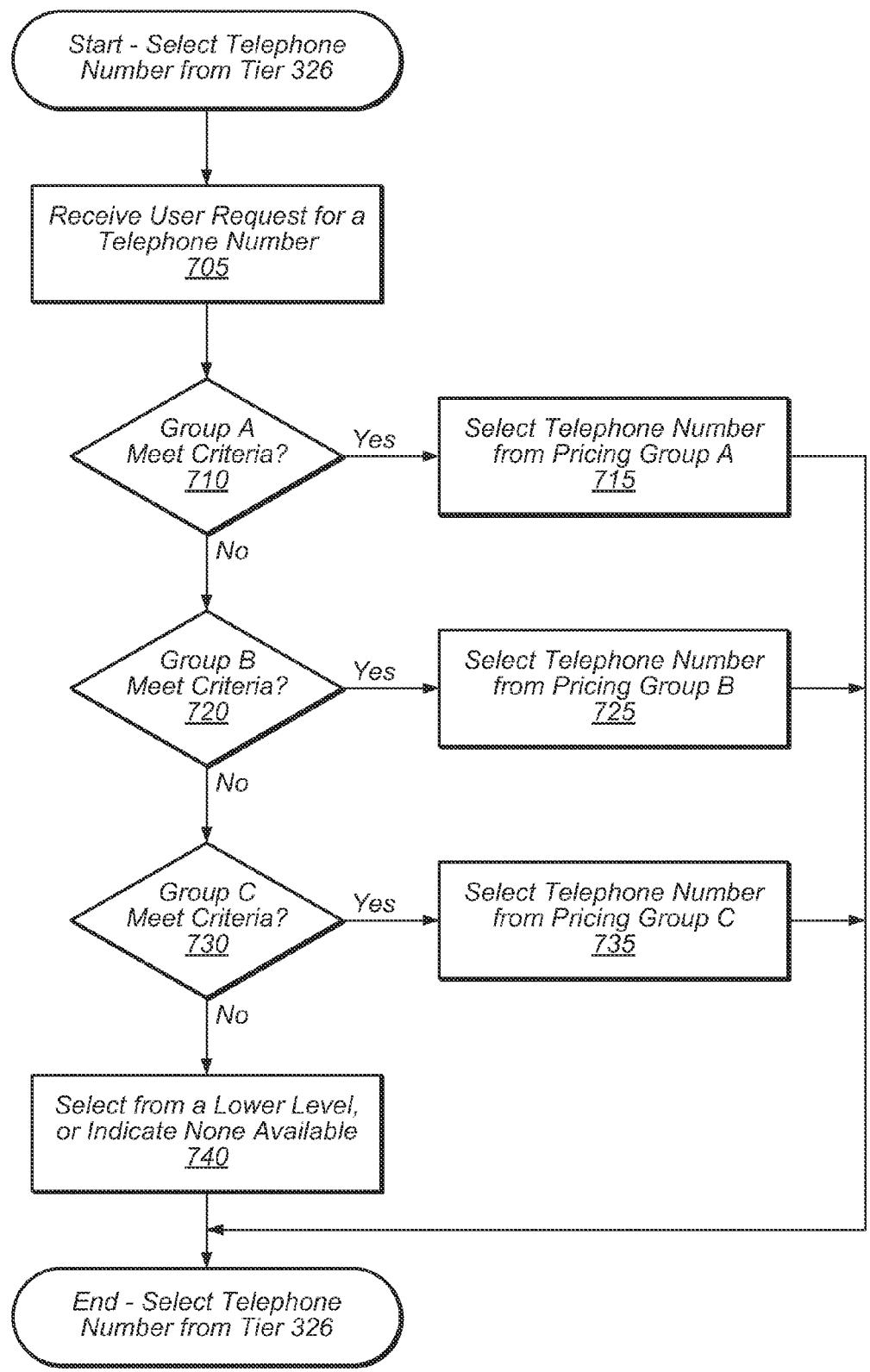
FIG. 7 is a generalized flow diagram illustrating one embodiment of a method for selecting a telephone number from a tier.

Referring now to FIG. 7, an embodiment of a method 700 for selecting a telephone number from a tier is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Method 700 may apply to the illustration of tier 326 shown in FIG. 6 with three different pricing groups.

In one embodiment, method 700 may begin by receiving a user request for a telephone number from tier 326 (block 705). The user may be an actual end-user or another reseller, and the request may be made with certain specified criteria indicating what type of telephone number is desired. Next, it may be determined if any available telephone numbers from group A meet the criteria (conditional block 710). Since group A is the group with the cheapest telephone numbers, group A may be the first group within the tier that is considered. In one embodiment, group A may include telephone numbers that are within a certain range of prices, and the cheapest telephone number(s) from group A may be the first telephone number(s) selected if they meet the required criteria. If a telephone number from group A meets the criteria (conditional block 710), then a telephone number may be selected from pricing group A and activated for the end-user (block 715).

If a telephone number from group A does not meet the criteria (conditional block 710), then it may be determined if a telephone number from group B meets the criteria (conditional block 720). If a telephone number from group B meets the criteria (conditional block 720), then a telephone number may be selected from pricing group B and activated for the end-user (block 725). If a telephone number from group B does not meet the criteria (conditional block 720), then it may be determined if a telephone number from group C meets the criteria (conditional block 730).

If a telephone number from group C meets the criteria (conditional block 730), then a telephone number may be selected from pricing group C and activated for the end-user (block 735). If a telephone number from group C does not meet the criteria (conditional block 730), then a telephone number may be selected from any other available groups or if group C was the last group, then tier 326 may indicate to the end-user that no telephone numbers met the criteria (block 740). After blocks 715, 725, 735, and 740, method 700 may end for the selection of this particular telephone number.

Turning now to FIG. 8, one embodiment of a versioning database 800 is shown. Versioning database 800 may be utilized to keep track of the history for the plurality of telephone numbers within a VoIP network. Versioning database 800 is one example of a database, and other types of databases may be formatted in any of various other manners and include other types of information. Each reseller and vendor may have access to a portion of the versioning database corresponding to their own supply of telephone numbers, and this portion of the versioning database may include historical information for their specific telephone numbers.

As shown in FIG. 8, versioning database 800 includes listings for telephone numbers '555-0000', '555-0001', and '555-0002'. These telephone numbers are representative of any number of telephone numbers that may be tracked in a versioning database. Other versioning databases may have thousands or millions of telephone numbers which may be tracked and in which the history of each telephone number may be stored.

Some of the fields of information for each telephone number may include a date field indicating the date of a change to any information associated with the telephone number. The fields may also include an E911 field, reseller field, voice mail service associated with the telephone number, SIP trunk for routing of calls to the telephone number, a price that was paid for the telephone number, and any of a variety of other information fields. Any time there is a change with any of the relationships, services, or other attributes of a telephone number, the change may be logged in versioning database 800.

For example, Vendor 805 may be setup to provide E911 service for telephone number '555-0000'. Then, later changes to '555-0000' may include a change to vendor 810 for SIP trunking services, reseller 815 may reallocate VoIP service, and E911 service may be transferred to vendor 820 from vendor 805. All of these events are logged in versioning database 800 as shown in FIG. 8. Telephone number '555-0001' has entries in versioning database 800 to log that vendor 825 is a provider of voice mail service and vendor 830 is a provider of E911 service. Telephone number '555-0002' may have entries in versioning database 800 for resellers 835 and 840 activating VoIP service, vendor 845 for voice mail service, vendor 850 for SIP trunk service, and vendor 855 for E911 service.

The entries shown in FIG. 8 represent only a small portion of entries which may be included in versioning database 800. In some embodiments, a versioning database may also include information associated with the end-user of the telephone number, such as address, payment (credit card) information, billing statements, and other information. Versioning database 800 may utilize any type of database for storing and organizing the historical data associated with the VoIP network's telephone numbers.

Figure 9:
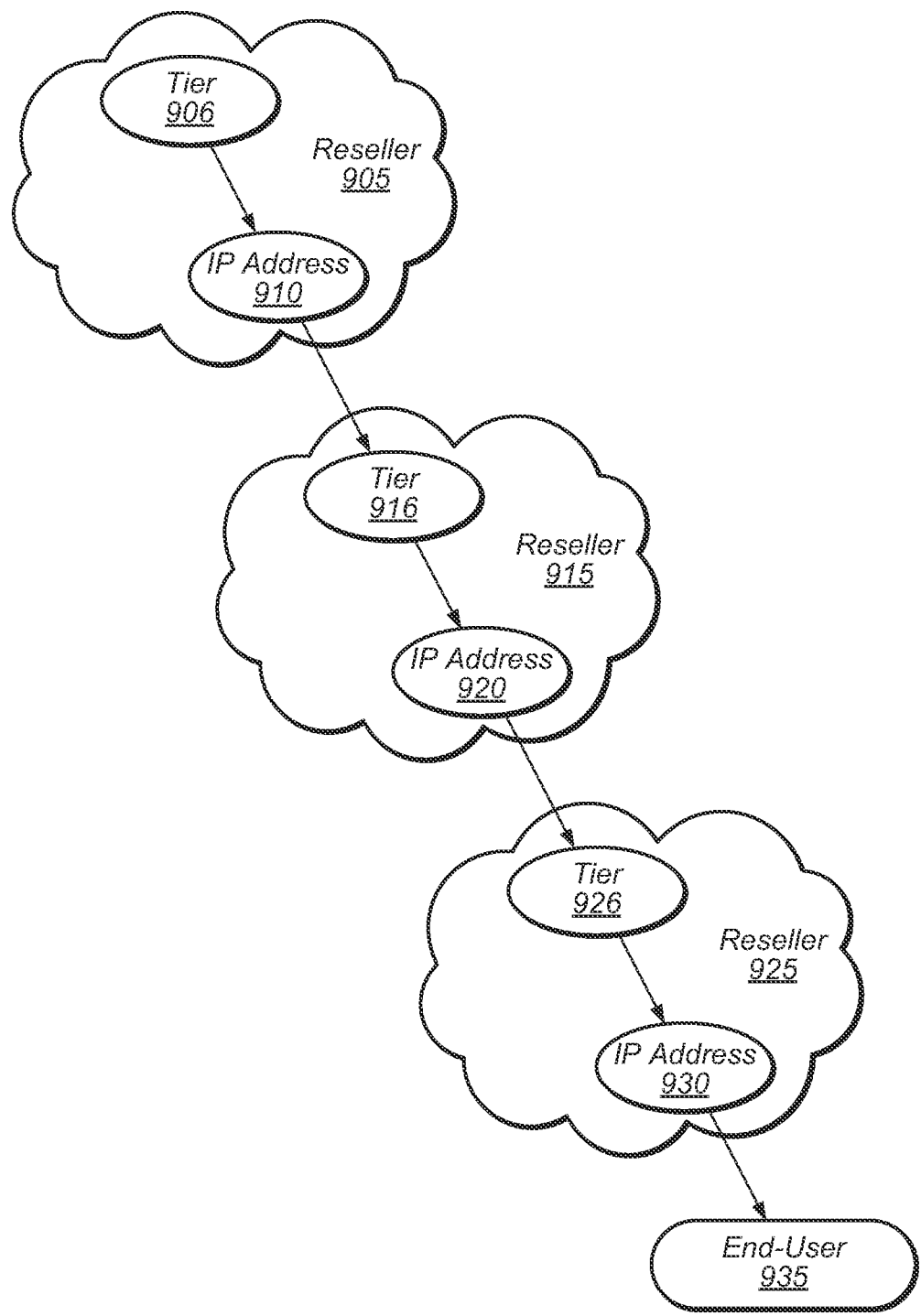
FIG. 9 illustrates one embodiment of the activation of a telephone number through multiple resellers.

Referring now to FIG. 9, one embodiment of the activation of a telephone number through multiple resellers is shown. The telephone number may be purchased by end-user 935 and provisioned through multiple resellers from the original reseller that is providing the telephone number. In one embodiment, an origination director may be utilized to activate a telephone number. The origination director may determine how to activate the telephone number, how to use available minutes, which switches to utilize during the activation process, and may perform other tasks, depending on the embodiment. The origination director may also be referred to as a routing appliance. The origination director may utilize SIP standards to communicate routing information to various switching devices. When a phone number is activated through many resellers of a VoIP reseller network, the activation process may traverse several hops through the reseller network. During each hop through a reseller's platform, the activation process may point to an IP address to move through the reseller's platform. The origination director may be configured to route the activation through the switches of each connection point as the activation traverses the reseller network to its destination. In some embodiments, a termination director may also be utilized in a similar fashion for terminating phone calls through the VoIP network platform.

In the example shown in FIG. 9, reseller 905 may be the original source of the telephone number, and after the telephone number has been selected and purchased by end-user 935, reseller 905 may be notified of the activation of the telephone number. As shown in FIG. 9, the telephone number may originate in tier 906. The telephone number may be routed to IP address 910, which is used to represent a routing of the activation through the network of reseller 905.

From IP address 910, the activation signal may be propagated to tier 916 of reseller 915. It is assumed for purposes of this discussion that reseller 915 included the chosen telephone number within tier 916 of its telephone number offerings. The activation may be routed through the network of reseller 915 to IP address 920, and then the activation may be propagated to tier 926 of reseller 925. Likewise, for purposes of this discussion, it is assumed that reseller 925 included the chosen telephone number within tier 926 of its telephone number offerings. Then the activation may be routed through the switching circuitry of reseller 925 to IP address 930. From IP address 930, the activation may reach end-user 935 and the telephone number may then be setup and ready for VoIP service.

Generally speaking, an activation of a telephone number may utilize a routing appliance to propagate and point the telephone number to IP addresses at exit points of a given reseller's network. The routing appliance may use SIP standards to communicate routing information to the switching gear of each given reseller's network. This activation may then allow end-user 935 to seamlessly activate their telephone number for VoIP service. In other embodiments, the numbers of resellers traversed in the activation of a telephone number may be greater than or less than three.

Each reseller shown in FIG. 9 may run VoIP system management software application to configure and manage its VoIP individual network platform. In one embodiment, the VoIP system management software application may run on a server or computing device managed by each reseller. In another embodiment, the VoIP system management software application may be an externally hosted software application. The VoIP system management software application may reside on a separate computing device from the computing device utilized by a given reseller. The computing device utilized by a given reseller may include a user portal software application or other type of software application for interfacing and communicating with the externally hosted VoIP system management software application.

Figure 10:
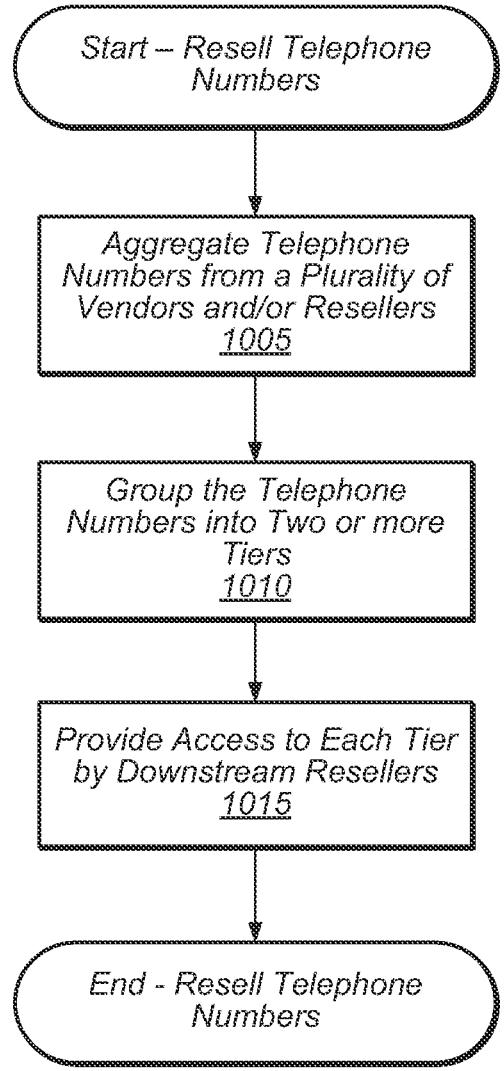
FIG. 10 is a generalized flow diagram illustrating one embodiment of a method for aggregating VoIP services at a given reseller.

Referring now to FIG. 10, an embodiment of a method 1000 for reselling telephone numbers is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, method 1000 may begin by a first reseller executing a software application to aggregate a plurality of telephone numbers from a plurality of vendors and/or other resellers (block 1005). The software application may be hosted in the cloud as a SaaS, and the first reseller may access the software application via a user portal running on any suitable computing device. A portion of the telephone numbers may be from the first reseller's own supply, and a portion of the telephone numbers may be procured from the vendors and/or other resellers. The plurality of telephone numbers may be grouped into two or more tiers by the first reseller (block 1010). Then, access to each tier may be provided to downstream clients and resellers (block 1015). Each tier may be re-branded by the first reseller to obscure the actual source of the telephone numbers in the tier. Telephone numbers may be automatically selected from each tier by the software application so as to maximize the profit for the first reseller. Method 1000 may also be performed for other services besides providing telephone numbers and telephone number activation. Also, method 1000 may be performed by a plurality of resellers in a VoIP network.

Figure 11:
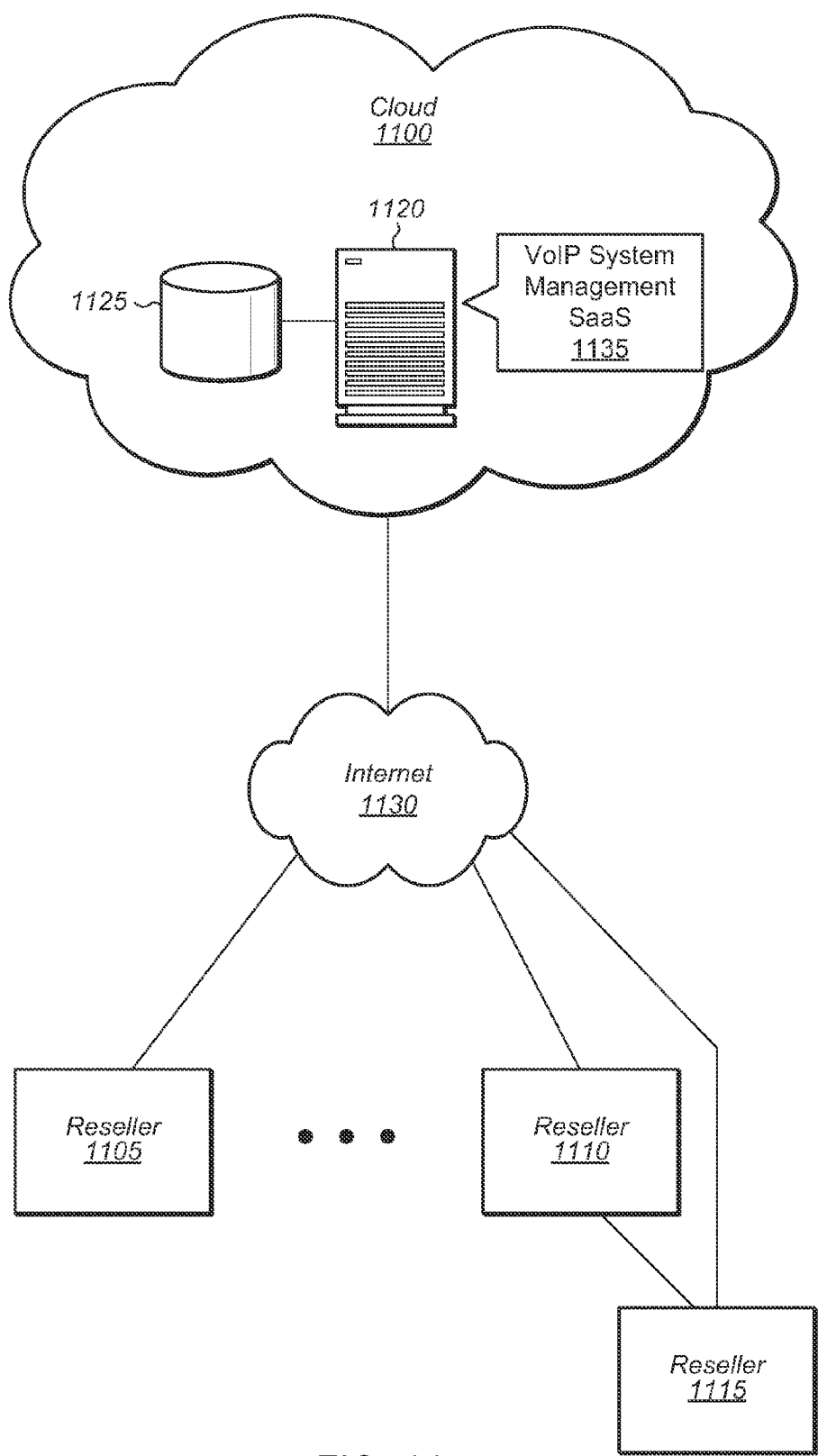
FIG. 11 is a block diagram of one embodiment of a cloud based VoIP coupled to a multi-hierarchy of resellers.

Turning now to FIG. 11, a block diagram of one embodiment of a cloud based VoIP service coupled to a multi-hierarchy of resellers is shown. Cloud 1100 may provide the computing resources for executing a VoIP system management SaaS 1135, and resellers 1105, 1110, and 1115 may be coupled to cloud 1100 via internet 1130. Cloud 1100 may include server 1120 and database 1125 for hosting the SaaS 1135 and storing the corresponding data. Server 1120 and database 1125 are representative of any number of servers and databases, respectively, that may reside in cloud 1100.

Resellers 1105-1115 are representative of any number of resellers that may be connected to cloud 1100 for accessing the multi-tenant SaaS 1135. Each of resellers 1105-1115 may include any type of computing device(s) for connecting to cloud 1100 via internet 1130. Resellers 1105-1115 are also representative of any number of levels of hierarchy for a reseller network. For example, reseller 1115 is shown as a downstream reseller of reseller 1110, and additional downstream resellers may be coupled below reseller 1115. Each reseller 1105-1115 may access and execute multi-tenant SaaS 1135, and the data and configuration of SaaS 1135 may be virtually partitioned to accommodate each reseller. In other words, each reseller 1105-1115 may run a customized virtual application instance of SaaS 1135. Cloud 1100 may also be coupled to a plurality of vendors (not shown) via internet 1130. SaaS 1135 may provide each reseller 1105-1115 access to the VoIP services supplied by these vendors.

It is noted that the above-described embodiments may comprise software. In such an embodiment, program instructions and/or a database (both of which may be referred to as "instructions") that represent the described systems and/or methods may be stored on a non-transitory computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, Flash memory, non-volatile memory (e.g. Flash memory) accessible via a peripheral interface such as the USB interface, etc. Storage media may include microelectro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service or Integration as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A system for managing a Voice over Internet Protocol (VoIP) network, the system comprising:
   a database; and
   a server coupled to the database;
   wherein the server is configured to:
   aggregate a plurality of services of a first type, wherein at least a portion of the plurality of services are procured from one or more vendors;
   group the plurality of services into two or more tiers; and
   provide access to the two or more tiers to downstream resellers providing VoIP service including at least a first reseller and a second reseller, wherein at least a portion of a plurality of services of a first type are supplied by the first reseller;
   wherein the second reseller has access to a service of the first type through at least two separate paths, and wherein the server is configured to automatically select a path with a lowest cost for the first service.

2. The system as recited in claim 1, wherein the server is further configured to:
   aggregate a plurality of services of a second type, wherein at least a portion of the plurality of services are procured from one or more vendors;
   group the plurality of services of the second type into two or more tiers; and
   provide access to the two or more tiers to downstream resellers.

3. The system as recited in claim 1, wherein the first type of service is telephone number activation.

4. The system as recited in claim 1, wherein services are automatically selected from a given tier such that a margin is maximized for a first reseller.

5. The system as recited in claim 1, wherein the system further comprises a plurality of resellers providing VoIP service to resell VoIP services to other resellers.

6. A method comprising:
   aggregating a plurality of Voice over Internet Protocol (VoIP) services of a first type, wherein at least a portion of the plurality of VoIP services are procured from one or more vendors;
   grouping the plurality of VoIP services into two or more tiers; and
   providing access to the two or more tiers to downstream resellers providing VoIP service including at least a first reseller and a second reseller, wherein at least a portion of a plurality of services of a first type are supplied by the first reseller;
   wherein the second reseller has access to a service of the first type through at least two separate paths; and
   automatically selecting a path with a lowest cost for the first service.

7. The method as recited in claim 6, further comprising:
   aggregating a plurality of VoIP services of a second type, wherein at least a portion of the plurality of VoIP services are procured from one or more vendors;
   grouping the plurality of VoIP services of the second type into two or more tiers; and
   providing access to the two or more tiers to downstream resellers.

8. The method as recited in claim 6, wherein the first type of VoIP service is telephone number activation.

9. The method as recited in claim 6, wherein VoIP services are automatically selected from a given tier such that a margin is maximized for a first reseller.

10. The method as recited in claim 6, further comprising aggregating a plurality of VoIP services of the first type for provision by a second reseller, wherein at least a portion of the plurality of VoIP services are procured from the first reseller.

11. A non-transitory computer readable storage medium comprising program instructions, wherein when executed the program instructions are operable to:
    aggregate a plurality of Voice over Internet Protocol (VoIP) services of a first type, wherein at least a portion of the plurality of VoIP services are procured from one or more vendors;
    group the plurality of VoIP services into two or more tiers; and
    provide access to the two or more tiers to downstream resellers providing VoIP service including at least a first reseller and a second reseller, wherein at least a portion of a plurality of services of a first type are supplied by the first reseller;
    wherein the second reseller has access to a service of the first type through at least two separate paths; and
    automatically select a path with a lowest cost for the first service.

12. The non-transitory computer readable storage medium as recited in claim 11, wherein when executed the program instructions are further operable to:
    aggregate a plurality of VoIP services of a second type, wherein at least a portion of the plurality of VoIP services are procured from one or more vendors;
    group the plurality of VoIP services of the second type into two or more tiers; and
    provide access to the two or more tiers to downstream resellers.

13. The non-transitory computer readable storage medium as recited in claim 11, wherein the first type of VoIP service is telephone number activation.

14. The non-transitory computer readable storage medium as recited in claim 11, wherein VoIP services are automatically selected from a given tier such that a margin is maximized for a first reseller.

15. A system for managing a Voice over Internet Protocol (VoIP) network, the system comprising:
    a database; and
    a server coupled to the database;
    wherein the server is configured to:
    aggregate a plurality of services of a first type, wherein at least a portion of the plurality of services are procured from one or more vendors;
    group the plurality of services into two or more tiers; and
    provide access to the two or more tiers to downstream resellers providing VoIP service including at least a first reseller and a second reseller;
    wherein the second reseller has access to a service of a first type through at least two separate paths, and wherein the server is configured to automatically select a path with a lowest cost for the first service;
    wherein the first reseller is configured to resell VoIP services to the second reseller.

16. A method comprising:
- aggregating a plurality of Voice over Internet Protocol (VoIP) services of a first type, wherein at least a portion of the plurality of VoIP services are procured from one or more vendors;
- grouping the plurality of VoIP services into two or more tiers; and
- providing access to the two or more tiers to downstream resellers providing VoIP service including at least a first reseller and a second reseller;
- wherein the second reseller has access to a service of a first type through at least two separate paths; and
- automatically selecting a path with a lowest cost for the first service;
- wherein the first reseller is configured to resell VoIP services to the second reseller.

17. A non-transitory computer readable storage medium comprising program instructions, wherein when executed the program instructions are operable to:
- aggregate a plurality of services of a first type, wherein at least a portion of the plurality of services are procured from one or more vendors;
- group the plurality of services into two or more tiers; and
- provide access to the two or more tiers to downstream resellers providing VoIP service including at least a first reseller and a second reseller;
- wherein the second reseller has access to a service of a first type through at least two separate paths;
- automatically select a path with a lowest cost for the first service;
- wherein the first reseller is configured to resell VoIP services to the second reseller.

* * * * *